United States Patent [19]
Schwerdhofer

[11] 3,828,627
[45] Aug. 13, 1974

[54] MULTIPLE-SPEED HUB
[75] Inventor: Hans-Joachim Schwerdhofer, Schweinfurt am Main, Germany
[73] Assignee: Fichtel & Sachs AG, Schweinfurt am Main, Germany
[22] Filed: Nov. 28, 1972
[21] Appl. No.: 310,138

[30] Foreign Application Priority Data
Dec. 2, 1971 Germany............................ 2159770

[52] U.S. Cl. ............................. 74/750 B, 192/6 A
[51] Int. Cl............................................. F16h 3/44
[58] Field of Search.................. 74/750 B; 192/6 A

[56] References Cited
UNITED STATES PATENTS
2,143,798  1/1939  Ribe............................... 192/6 A X
2,180,527  11/1939 Jones.................................. 192/6 A
3,113,652  12/1963 Schwerdhofer...................... 192/6 A
3,180,167  4/1965  Paschakarnis.................. 74/750 B UX
3,299,745  1/1967  Toplis................................ 74/750 B
3,536,171  10/1970 Bergles................................ 192/6 A Primary Examiner—Samuel Scott
Assistant Examiner—J. Reep
Attorney, Agent, or Firm—Hans Berman

[57] ABSTRACT
A three-speed hub for a bicycle or like vehicle has a driver and a hub shell coaxially rotatable on a stationary shaft, planetary gearing, and a coupling sleeve manually shifted for coupling the driver to the ring gear or the planet carrier of the gearing. One of two pawl-and-ratchet clutches is normally coupled to the ring gear to transmit torque to the hub shell but is released when cooperating abutments on the coupling sleeve and the ring gear axially retract the ring gear whereupon torque is transmitted from the planet carrier to the hub by the second clutch. The pawl carrier of the latter may simultaneously carry the brake cone of a coaster brake. Three transmission ratios are available.

10 Claims, 8 Drawing Figures

MULTIPLE-SPEED HUB

This invention relates to multiple-speed hubs for bicycles and like vehicles, and particularly to a hub providing at least three transmission ratios between an input or driver member and the hub shell which serves as the output member.

More specifically, this invention is concerned with improvements in the multiple speed hub disclosed in the published German patent application No. 1,605,763. The known hub can be assembled from a relatively small number of component parts at correspondingly low cost. However, it cannot employ pawl-and-ratchet clutches for transmitting torque between the elements of a planetary gearing and the hub. Yet, such clutches have well known advantages in multiple-speed hubs for bicycles and like vehicles, such as low cost, reliability, and smooth operation.

It is an object of the present invention to provide a multiple-speed hub combining the relatively small number and cost of components characteristic of the known device with the use of pawl-and-ratchet clutches for transmitting torque between the planetary gearing and the hub shell. It is a supplementary object to prevent blocking of a wheel mounted on the hub when the wheel is rolled backward after a coaster brake in the hub was applied.

With these and other objects in view, the hub of the invention has a shaft on which a driver and a hub shell are mounted for coaxial rotation. The planetary gearing which is operatively interposed between the driver and hub shell for rotating the hub shell at a selected one of a plurality of output speeds when the driver rotates at a predetermined input speed includes an internally toothed ring gear rotatable about the axis of the shaft and axially movable between two positions. A planet gear on a planet carrier rotatable about this axis simultaneously meshes with the internal teeth of the ring gear and with a sun gear fixed on the shaft and axially offset from the driver. The pawl carriers of two pawl-and-ratchet clutches are axially juxtaposed on a portion of the planet carrier spaced from the sun gear in a direction away from the driver, and the pawls are biased toward a position of driving engagement with associated ratchet teeth on the hub shell by pawl springs. A first coupling device is axially movable for alternatively coupling the driver to the planet carrier and to the ring gear for joint rotation. Cooperating abutments on the coupling device and the ring gear move the ring gear between two axial positions in response to a predetermined axial movement of the coupling device. A second coupling device on the ring gear engages one of the two pawl carriers in one of the two axial positions of the ring gear for joint rotation of the engaged pawl carrier with the ring gear, and means are provided for transmitting rotary motion from the planet carrier to the pawl carrier of the second clutch.

Other features, additional objects, and many of the attendant advantages of this invention will readily become apparent from the following detailed description of preferred embodiments of the invention when considered in connection with the appended drawing in which.

Figure 1:
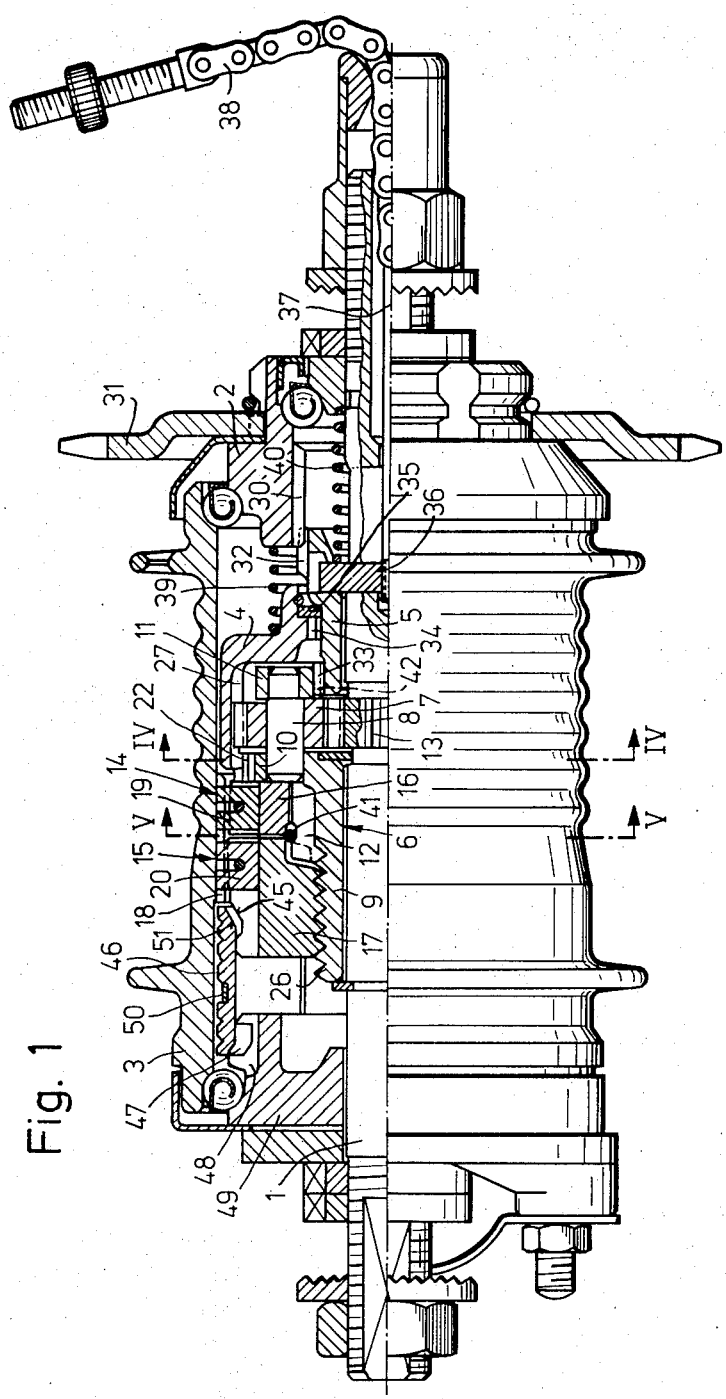
FIG. 1 shows a three-speed hub of the invention equipped with a coaster brake partly in rear elevation and partly in rear-elevational section through the hub axis.

Referring now to the drawing in detail, and initially to FIG. 1, there is seen a partly tubular and axially slotted shaft 1 which is normally fixedly mounted in the rear fork of a bicycle. A ball bearing on the shaft 1 rotatably supports a tubular driver 2 on one end of the shaft 1 which will be referred to as the drive end hereinafter. A hub shell 3 of generally cylindrical configuration is coaxially supported by ball bearings on the driver 2 and on the end of the shaft 1 remote from the drive end and hereinafter referred to as the brake end.

Torque is transmitted from the driver 2 to the hub shell 3 by planetary gearing including an internally toothed, axially movable ring gear 4. In the condition of the hub illustrated in FIG. 1, a coupling sleeve 5 coaxially rotatable and axially slidable on the shaft 1 connects the driver 2 to the planet carrier 6 of the planetary gearing which also includes three planet gears 7 mounted on planet shafts 8 for rotation about respective axes spacedly parallel to that of the shaft 1, only one gear 7 and shaft 8 being seen in FIG. 1.

The planet carrier 6 has a sleeve-shaped portion 9 and a flange portion 10 which radially projects from the axially terminal part of the portion 9 adjacent the driver 2 and carries the planet shafts 8. The planet gears 7 are axially secured on the shafts 8 by a retaining ring 11 which is fixedly fastened on the planet carrier flange 10 between the shafts 8 in a known manner, not specifically illustrated. Recesses 12 in the sleeve-shaped portion 9 are axially aligned with the openings in the flange portion 10 receiving the planet shafts for facilitating the installation of the latter. The planet gears 7 simultaneously mesh with the ring gear 4 and a sun gear 13 integrally cut from the shaft 1 in the usual manner.

Figure 5:
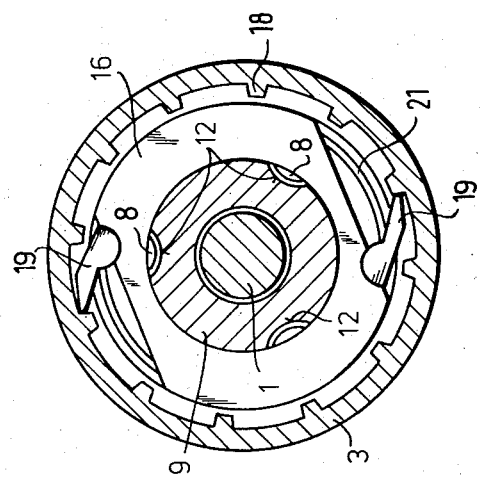

Two pawl-and-ratchet clutches 14, 15 can connect the planetary gearing with the hub shell 2. The pawl carrier 16 of the first clutch 14 is rotatably mounted on the planet carrier portion 9 contiguously adjacent the flange 10 and is dimensioned to prevent axial movement of the shafts 8 away from the drive end of the hub. As is better seen in FIG. 5, the outer circumference of the annular pawl carrier 16 includes two parallel flats which facilitate assembly of the hub.

The pawl carrier 17 of the second clutch 15 is an element of a coaster brake, as will presently be described. Axially elongated, straight, internal ribs 18 which are circumferentially spaced on the inner face of the hub sleeve 3 provide the ratchet teeth associated with the two pawls 19 of the first clutch 14 and the corresponding pawls 20 of the second clutch 15. In the position of the hub illustrated in FIG. 1 and characteristic of the condition of the clutches 14, 15 during forward pedaling of the bicycle, the pawl carriers 16, 17 are axially contiguous, and the pawls 19, 20 are axially coextensive with portions of the associated pawl carriers 16, 17 under all operating conditions. A pawl spring 21 biases the pawls 19 toward driving engagement with the ratchet teeth 18, and the pawls 20 are similarly biased in a conventional manner.

Figure 4:
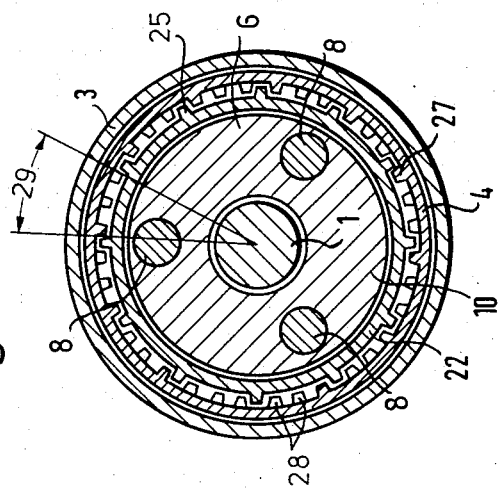
FIGS. 4 and 5 show the hub of FIG. 1 in section on the lines IV—IV and V—V respectively.

An annular flange 22 of rectangular section in the axial plane of FIG. 1 projects axially from the outer circumference of the pawl carrier 16 toward the planetary gearing. As is best seen in FIG. 4, the inner diameter of the flange 22 is slightly greater than the outer diameter of the flange portion 10 on the planet carrier 6, and the flange 22 envelops the flange portion 10 over its entire axial length. Circumferentially distributed, axially elongated teeth 25 project in a radially outward direction from the flange 22.

Figure 3A:
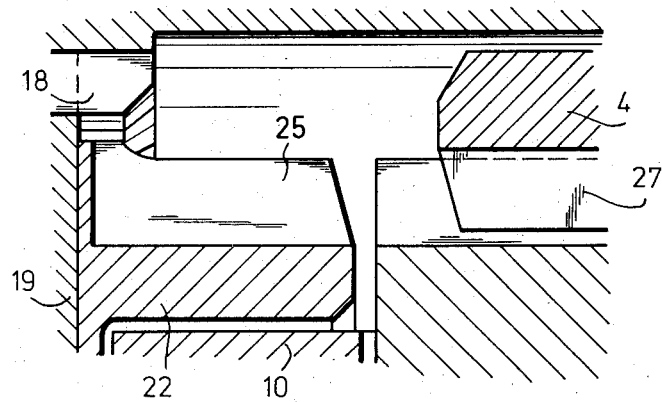
FIG. 3A illustrates the device of FIG. 1A in the condition of FIG. 3.

The ring gear 4 has two approximately cylindrical, axial sections of different diameter and a radial wall portion connecting the cylindrical sections. The inner wall of the wider cylindrical section carries straight, internal, axial ribs or elongated teeth 27, 28 which are uniformly distributed about the circumference of the ring gear. As is best seen in FIG. 4, two shorter ribs 28 alternate with one longer rib 27. The ribs 27, 28 mesh with the planet gears 7 in all axial positions of the ring gear 4. The shorter ribs 28 cannot engage the teeth 25 of the flange 22 in any axial position of the ring gear 4, and the longer teeth or ribs 27 of the ing gear 4 engage the teeth 25 on the flange 22 in the axial position of the ring gear illustrated in FIGS. 1 and 2 only, the relationship of the teeth 25, 27 in FIGS. 1 and 2 being shown in more detail in FIG. 1A, and the relationship of the teeth in FIG. 3 being best seen in FIG. 3A.

The circumferential spacing of the teeth 25 on the flange 22 is equal to that of the long internal teeth or ribs 27 on the ring gear 4, and the circumferential width of the teeth 25, 27, 28 is equal. When there is a reversal of relative angular motion between the pawl carrier 14 and the ring 4, there is a lost motion corresponding to the angular spacing 29 of circumferentially opposite flanks of two adjacent teeth 25, as is shown in FIG. 4. This lost motion is slightly greater than the corresponding spacing of adjacent ratchet teeth 18 because of the greater width of the latter.

The coupling sleeve 5 rotates with the driver 2 in all its axial positions, axially elongated ribs 30 on an internal surface of the driver 2 maintaining engagement with corresponding external ribs 32 on the drive end of the coupling sleeve 5 and transmitting torque to the planetary gearing from a sprocket 31 mounted on the driver 2 outside the hub shell 3 as is conventional. Elongated external ribs 33 on the brake end of the coupling sleeve 5 engage corresponding internal ribs 42 on the retaining ring 11 and thereby rotate the planet carrier 6 at the speed of the sprocket 31 in the condition of the hub shown in FIG. 1.

The sleeve 5 may be retracted toward the drive end of the hub until its ribs 33 engage mating ribs 34 on an inner face of the narrower cylindrical portion of the ring gear 4, whereby an abutment ring 35 located at the drive end of the ribs 34 abuttingly engages radial end faces of the ribs 33. During further movement of the sleeve 5 toward the drive end of the hub, the ring gear 4 is taken along by abutting engagement of the ribs 33 with the ring 35.

The sleeve 5 may be moved manually by the rider of the non-illustrated bicycle in which the illustrated hub normally is installed. A slide 36 radially projects from an axial slot in the hollow drive end of the shaft 1 into a mating radial recess of the coupling sleeve 5. The slide 36 is fixedly fastened to a rod 37 which is axially guided in the hollow end of the shaft 1 and attached to a link chain 38. The latter is connected in a conventional manner with a non-illustrated gear-changing lever on the handle bars of the bicycle. The lever permits the rod 37 to be pulled out of the shaft 1 in two steps determined by click stops on the gear changing lever, as is well known in itself. The rod 37 is biased inward of the shaft 1 by a helical compression spring 39 axially interposed between the slide 36 and a bearing ring fixed on the drive end of the shaft 1. The ring gear 4 is additionally biased toward the brake end of the hub by a helical compression spring 40 interposed between the radial wall of the ring gear and the driver 2 which is axially fixed by a spring clip. The first pawl carrier 16 is similarly fixed on the planet carrier 6 by a spring clip 41.

The afore-mentioned coaster brake includes the second pawl carrier 17 which is mounted on the sleeve-shaped portion 9 of the planet carrier 6 by means of coarse, square threads 26 so inclined that the friction between the pawls 20 and the hub shell 2 drives the pawl carrier 17 into abutting engagement with the spring clip 41. A conical face 45 of the pawl carrier 17 tapers toward the brake end of the hub and an axially split braking sleeve 46. Axial ribs 47 of the sleeve 46 engage corresponding ribs 48 of a bearing ring 49 fixedly mounted on the shaft 1, and prevent rotation of the sleeve 46 about the hub axis. An annular spring 50 secures the two halves of the sleeve 46 to each other and normally keeps them out of engagement with the inner face of the hub shell 2. When the pawl carrier 17 moves toward the brake end of the hub on its threads 26, its conical face 45 engages a conical face 51 on the sleeve 46, thereby radially spreading the sleeve 46 against the restraint of the spring 50 into frictional engagement with the hub shell 3 for braking the latter.

The three-speed hub illustrated in FIGS. 1 to 5 operates as follows:

In the high-speed condition shown in FIG. 1, in which the coupling sleeve 5 is in its first position, farthest from the drive end of the shaft 1, torque is transmitted from the sprocket 31 by the driver 2 and the coupling sleeve 5 to the retaining ring 11 and planet carrier 6. The planet gears 7 roll on the sun gear 13 and drive the ring gear 4 at a higher speed. The second coupling constituted by the ribs 27, 25 of the gear 4 and of the pawl carrier 16 is engaged in the illustrated first axial position of the ring gear 4 and turns the pawls 19 at the speed of the ring gear 4, whereby the output speed of the hub shell 3 is higher than the input speed of the driver 2.

Figure 1A:
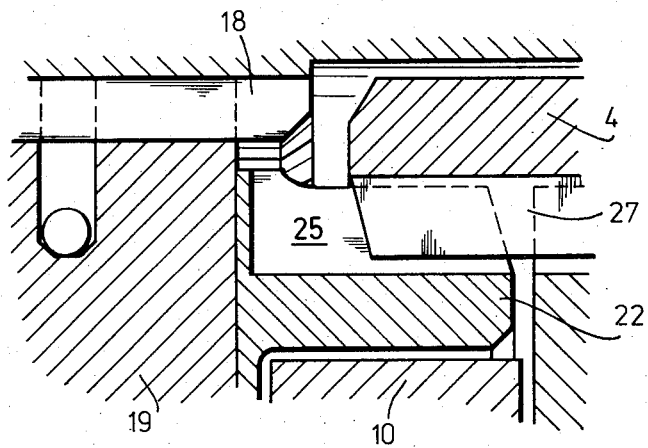
FIG. 1A shows a sectioned portion of the device of FIG. 1 on a greatly enlarged scale.
Figure 2:
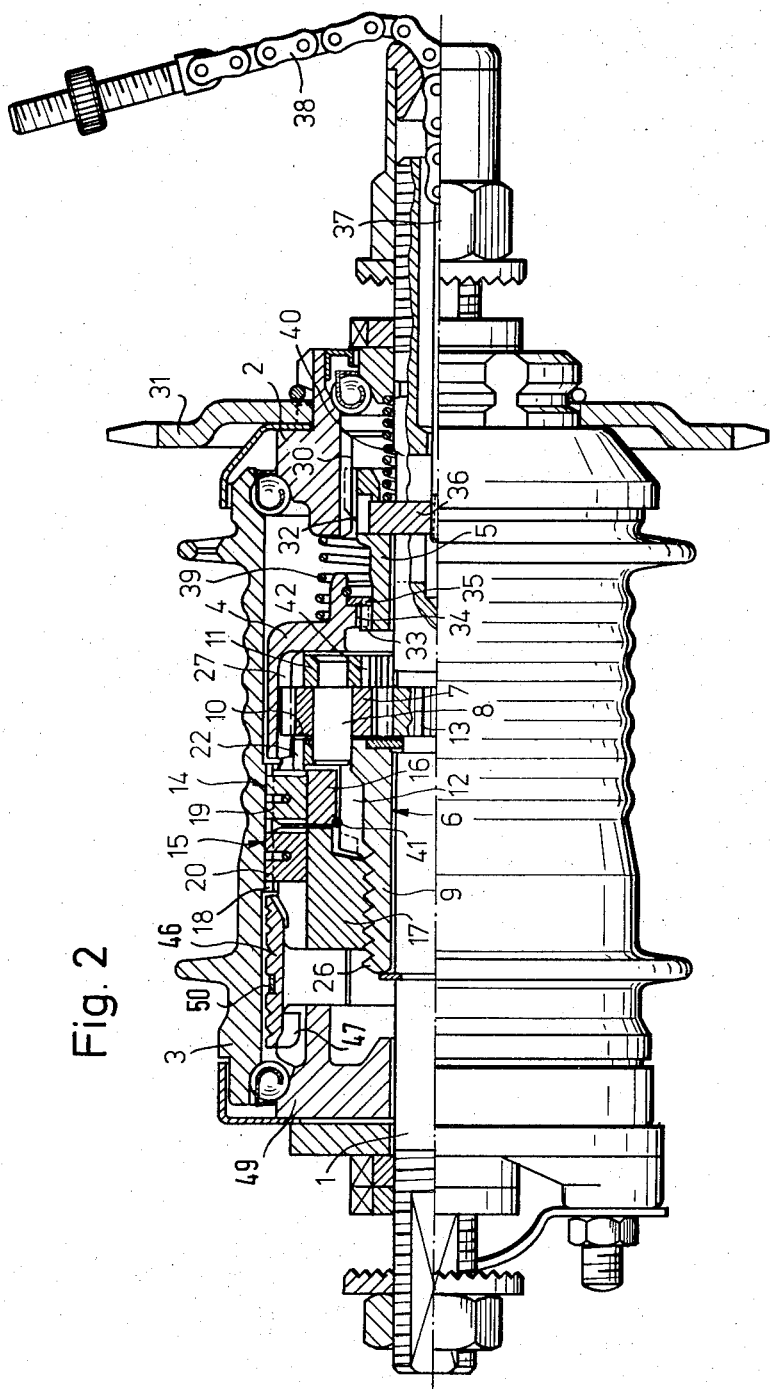
FIGS. 2 and 3 illustrate the apparatus of FIG. 1 in respective different operating conditions.

In the normal-speed condition of the hub shown in FIG. 2, the coupling sleeve 5 occupies its second or intermediate position in which it connects the sprocket 31 to the ring gear 4. The ribs 33 on the sleeve 5 are contiguously adjacent the radial abutment face of the ring 35, but the first axial position of the ring gear 4, as shown best in FIG. 1A, is being maintained. The ring gear 4 is turned at the input speed of the driver 2, and the second coupling 25, 27 transmits this speed to the pawls 19 and to the hub shell 3. In the high-speed condition, as well as in the normal-speed condition, the ratchet teeth 18 have a higher angular velocity than the pawls 20 on the second pawl carrier 17 so that they overrun the pawls 20.

Figure 3:
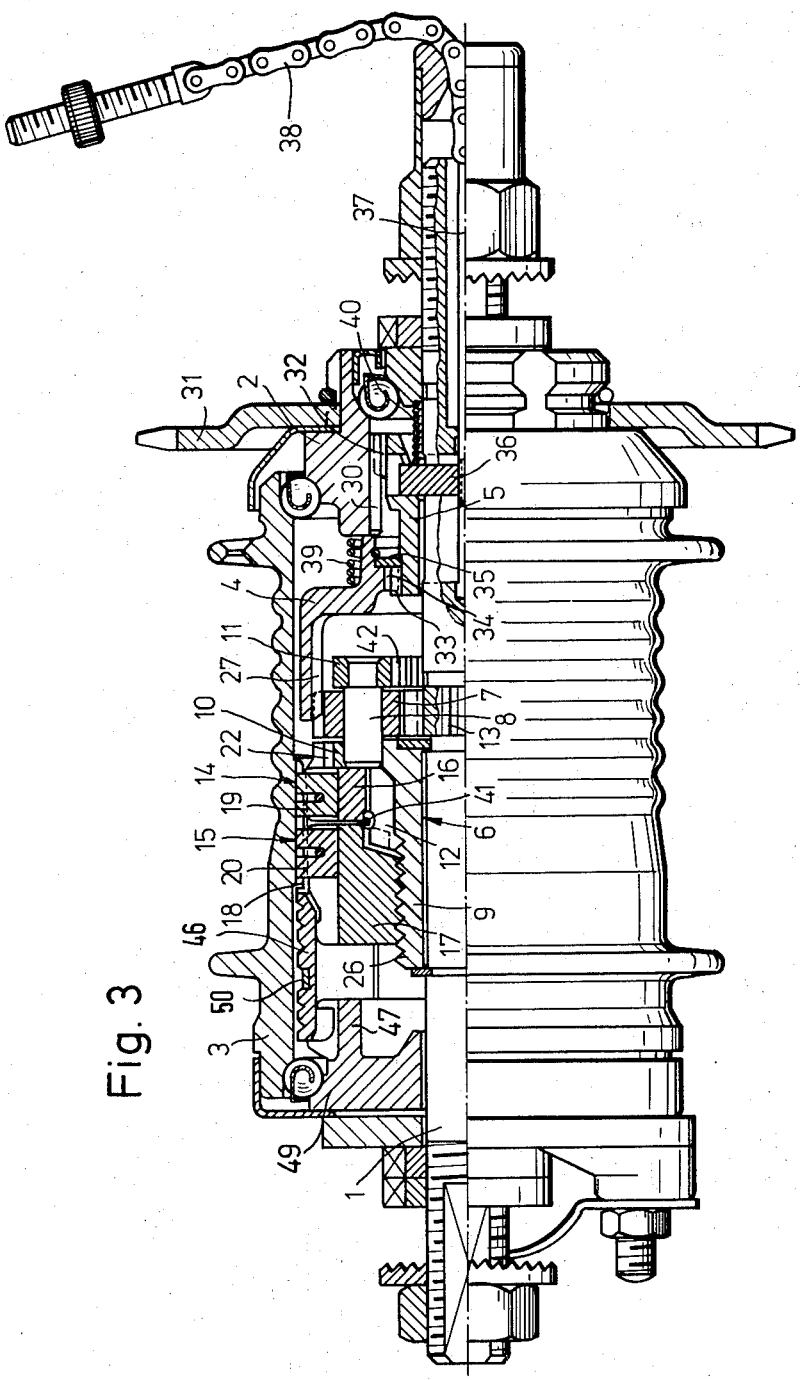

In the low-speed condition illustrated in FIG. 3, the slide 36 has been moved nearest the drive end of the shaft 1 by the chain 37 and the connected conventional Bowden cable and gear shifting lever, not shown, so that the coupling sleeve 5 assumes its third axial position in which it still transmits torque from the driver 2 to the ring gear 4, but the latter has been shifted toward the drive end by the ribs 33 of the sleeve 5 against the combined restraint of the springs 39, 40. As is seen most clearly in FIG. 3A, the second coupling 25, 27 is disengaged. Torque is transmitted from the sprocket 31 to the ring gear 4, and thence to the pawl carrier 17 by the planet gears 7 so that the hub shell 3 is driven by the pawls 20 at an output speed lower than the input speed of the driver 2. The pawl carrier 16 freely rotates on the sleeve-shaped portion 9 of the planet carrier 6.

During back-pedaling, the pawl carrier 17 moves threadedly on the sleeve-shaped portion 9 of the planet carrier 6 until its conical face 45 spreads the brake sleeve 46 in a manner conventional in coaster brakes, whereby rotation of the hub shell 3 relative to the fixed shaft 1 is impeded. The pawls 19, 20 are overrun by the ratchet teeth 18.

If the operator brakes the bicycle to a standstill, thereafter dismounts and manually moves the bicycle backward while the hub is in the high-speed or normal-speed condition, the ring gear 4 can be rotated backward by the hub shell 3 and transmit its movement to the planet carrier 6, whereby the threads 26 would tend to shift the pawl carrier 17 farther away from the drive end of the hub and to lock the conical faces 45, 51.

Such locking of the brake cannot occur if the pawls 20 are rotated backward by the ratchet teeth 18 simultaneously with the pawls 19 because the pawls 20 tend to shift the pawl carrier 17 toward the drive end of the hub, and the backward rotary speed of the pawl carrier 17 driven by the hub shell 3 is greater than the corresponding speed of the planet carrier 6 indirectly driven by the hub shell 3 by way of the planet gears 7. Locking of the brake under the conditions outlined above is prevented by the lost motion 29 in the first clutch 14. Regardless of the initial position of the pawls 19, 20, the ratchet teeth 18, because of their slightly smaller, angular, circumferential spacing than that of the ribs 27, must engage the pawls 20 before backward rotary motion can be transmitted from the pawls 19 to the ring gear 4.

The lost motion of the first pawl-and-ratchet clutch may be provided differently than is specifically illustrated. The same result could be achieved by interposing a rotatable ratchet ring between the pawls 19 and the hub shell 3, and by coupling the ring to the hub shell by circumferentially spaced ribs.

Figure 6:
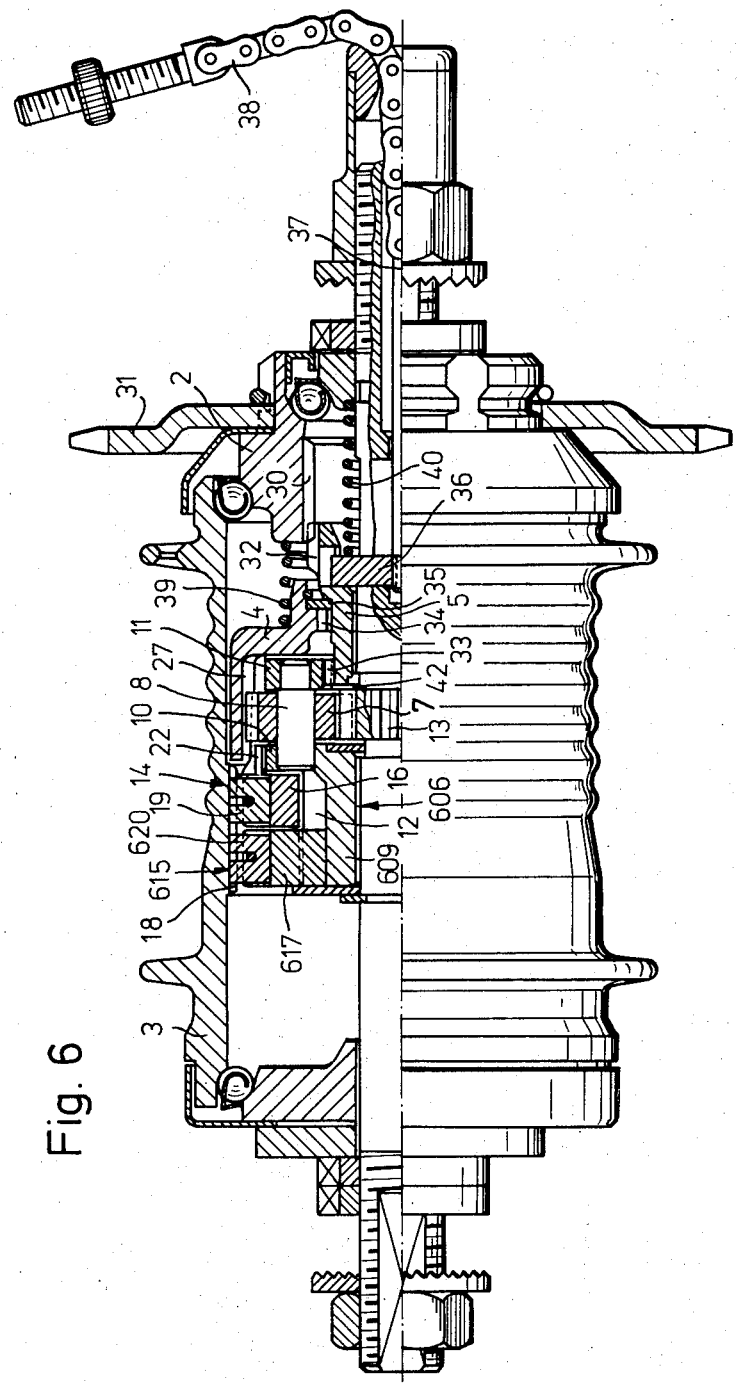
FIG. 6 shows a hub differing from that of FIG. 1 by the absence of the coaster hub and corresponding modifications of other elements.

The problem of brake blockage is non-existent in the modified embodiment of the invention shown in FIG. 6 which lacks a coaster brake, but is otherwise identical with the three-speed hub described with reference to FIGS. 1 - 5. Unchanged elements have been provided in FIG. 6 with the same reference numerals as in FIGS. 1 - 5, and they will not again be described. They include generally the portion of the drive train connecting the sprocket 31 to the hub shell 3 by way of the first clutch 14.

The planet carrier 606 has a sleeve-like portion 609 from which motion is transmitted to the pawl carrier 617 of the second clutch 615 by a pressure fit or shrink fit of mating face portions, the threads 26 not being available for the same purpose. The pawl carrier 617 is annular and constitutes a second, fixed, radial flange on the terminal part of the sleeve-shaped planet carrier portion 609 remote from the drive end of the shaft 1. The axial width of the associated pawl 620 is almost equal to that of the pawl carrier 617 so that the pawl 620 does not project axially beyond the carrier 617. The same relationship exists between the pawl 19 and the pawl carrier 16 in both illustrated embodiments.

The illustrated three-speed hubs of the invention have relatively few parts that are simple and rugged so that the hubs can be built at low cost and have a long useful life free from maintenance problems. The two pawl-and-ratchet clutches are axially contiguous under normal driving conditions and occupy little of the scarce space within the hub shell 3. Other features of the invention contribute to the compact arrangements of the operating elements in an obvious manner without interfering with easy assembly.

It should be understood, of course, that the foregoing disclosure relates only to preferred embodiments of the invention, and that it is intended to cover all changes and modifications of the examples of the invention herein chosen for the purpose of the disclosure which do not constitute departures from the scope and spirit of the invention set forth in the appended claims.

What is claimed is:

1. A multiple-speed hub for a bicycle and like vehicle comprising, in combination:
   a. a shaft having an axis;
   b. a driver member and a hub shell member mounted on said shaft for coaxial rotation;
   c. gear means operatively interposed between said members for rotating said hub shell member at a selected one of a plurality of different output speeds when said driver member rotates at a predetermined input speed, said gear means including
      1. an internally toothed ring gear rotatable about said axis and axially movable between two positions,
      2. a planet carrier rotatable about said axis,
      3. a sun gear fixed on said shaft and axially offset from said driver member,
      4. a planet gear rotatable on said carrier in simultaneous meshing engagement with the internal teeth of said ring gear and with said sun gear;
   d. first and second overrunning pawl-and-ratchet clutches including respective pawl carriers axially juxtaposed for rotation about said axis on a portion of said planet carrier spaced from said sun gear in a direction away from said driver member, a pawl on each pawl carrier, ratchet teeth on said hub shell member associated with each pawl, and yieldably resilient means biasing the pawl of each clutch toward a position of driving engagement with the associated ratchet teeth;
   e. first coupling means axially movable for alternatively coupling said driver member to said planet carrier and to said ring gear for joint rotation;
   f. cooperating abutment means on said coupling means and said ring gear for moving said ring gear between said positions thereof in response to a predetermined axial movement of said coupling means;
   g. second coupling means on said ring gear engaging the pawl carrier of said first clutch in one of said two axial positions of the ring gear for joint rotation of the engaged pawl carrier with said ring gear; and h. means for transmitting rotary motion from said planet carrier to the pawl carrier of said second clutch.

2. A hub as set forth in claim 1, wherein said portion of said planet carrier is sleeve-shaped, said planet carrier having a flange portion radially projecting from said sleeve-shaped portion and carrying said planet gear, the pawl carrier of said first clutch being mounted on said sleeve-shaped portion for rotation about said axis axially closely adjacent said flange portion, said pawl carrier of said first clutch being annular about said axis and having two substantially parallel and planar circumferential faces, said pawl of the first clutch being coextensive with said annular pawl carrier in an axial direction.

3. A hub as set forth in claim 2, wherein said planet carrier of said second clutch is annular, fixedly fastened to said sleeve-shaped portion, and radially projects from the same, the pawl of said second clutch being axially substantially coextensive with said fixedly fastened pawl carrier.

4. A hub as set forth in claim 1, further comprising cooperating brake means respectively secured to the pawl carrier of said second clutch and to said shaft, said pawl carrier of the second clutch being axially movable on said portion of said planet carrier toward and away from a position of engagement of said brake means.

5. A hub as set forth in claim 1, wherein said pawl carriers are axially contiguous to each other, and said hub shell carries a plurality of axially elongated, circumferentially offset, internal ribs, respective portions of said ribs constituting the ratchet teeth associated with the pawls of said first and second clutches.

6. A hub as set forth in claim 1, wherein said portion of said planet carrier is sleeve-shaped, said planet carrier having a flange portion radially projecting from an axially terminal part of said sleeve-shaped portion adjacent said sun gear and carrying said planet gear, the pawl carrier of said first clutch being mounted for rotation on said axially terminal part, said second coupling means including an annular flange on said pawl carrier of the first clutch, said flange being axially coextensive with the flange portion of said planet carrier, and engaging means on said annular flange and on said ring gear cooperating in said one axial position of said ring gear.

7. A hub as set forth in claim 6, wherein said engaging means include radial projections on said annular flange and on said ring gear for circumferential engagement with each other in said one axial position.

8. A hub as set forth in claim 7, wherein said ring gear carries a plurality of axially elongated, circumferentially offset, straight, internal ribs, respective longitudinal portions of said ribs constituting said internal teeth and said radial projections on said ring gear.

9. A hub as set forth in claim 8, wherein the angular circumferential spacing of the rib portions constituting said radial projections is greater than the angular, circumferential spacing of said ratchet teeth associated with the pawl of said second clutch.

10. A hub as set forth in claim 1, further comprising manually operable means for axially moving said first coupling means between three axial positions and for thereby axially moving said ring gear between said two positions thereof, said first coupling means coupling said driver member to said planet carrier in a first position of said first coupling means and to said ring gear in the second and third positions of said first coupling means, and said ring gear being in said one axial position thereof when said first coupling means is in the first and second positions of the same.

* * * * *